(12) United States Patent
Bendlin et al.

(10) Patent No.: US 10,693,621 B2
(45) Date of Patent: *Jun. 23, 2020

(54) VIRTUAL CARRIER AGGREGATION FOR WIDEBAND OPERATION OF WIRELESS COMMUNICATION SYSTEMS

(71) Applicant: AT&T Intellectual Property I, L.P., Atlanta, GA (US)

(72) Inventors: Ralf Bendlin, Cedar Park, TX (US); Thomas Novlan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,777

(22) Filed: Aug. 1, 2019

(65) Prior Publication Data

US 2019/0356462 A1 Nov. 21, 2019

Related U.S. Application Data

(63) Continuation of application No. 15/587,511, filed on May 5, 2017, now Pat. No. 10,419,196.

(51) Int. Cl.
*H04L 5/00* (2006.01)

(52) U.S. Cl.
CPC ............ *H04L 5/0098* (2013.01); *H04L 5/001* (2013.01); *H04L 5/0053* (2013.01); *H04L 5/0048* (2013.01)

(58) Field of Classification Search
CPC ..... H04L 5/0098; H04L 5/001; H04L 5/0053; H04L 5/0048; H04W 72/042
See application file for complete search history.

(56) References Cited

U.S. PATENT DOCUMENTS

| 5,852,630 A | 12/1998 | Langberg et al. |
| 7,460,526 B1 | 12/2008 | Hoffman et al. |

(Continued)

FOREIGN PATENT DOCUMENTS

| EP | 2 910 072 A1 | 8/2015 |
| EP | 3 163 781 A1 | 5/2017 |

(Continued)

OTHER PUBLICATIONS

Non-Final Office Action received for U.S. Appl. No. 15/587,511 dated Dec. 21, 2017, 26 pages.

(Continued)

*Primary Examiner* — Kenneth T Lam
(74) *Attorney, Agent, or Firm* — Amin, Turocy & Watson, LLP

(57) ABSTRACT

Facilitating virtual carrier aggregation for wideband operation of wireless communication systems is provided herein. A system can comprise: a processor; and a memory that stores executable instructions that, when executed by the processor, facilitate performance of operations. The operations can comprise: receiving, from a network device of network devices, downlink transmission data comprising downlink control information applicable to a downlink channel of the network device; as a function of the downlink transmission data, adjusting a subband of subbands resulting in an aggregation of multiple subbands; and transmitting uplink radio traffic data via the aggregation of multiple subbands to the network device.

20 Claims, 11 Drawing Sheets

(56) References Cited

U.S. PATENT DOCUMENTS

| | | |
|---|---|---|
| 8,903,433 B2 | 12/2014 | Jung et al. |
| 9,001,727 B2 | 4/2015 | Yang et al. |
| 9,077,601 B2 | 7/2015 | Muquet et al. |
| 9,270,303 B2 | 2/2016 | Kahrizi et al. |
| 9,282,523 B2 | 3/2016 | Yu et al. |
| 9,350,522 B2 | 5/2016 | Feng et al. |
| 9,351,292 B2 | 5/2016 | Choi et al. |
| 9,357,421 B2 | 5/2016 | Hwang et al. |
| 9,480,050 B2 | 10/2016 | Yang et al. |
| 9,491,782 B2 | 11/2016 | Kim et al. |
| 9,497,747 B2 | 11/2016 | Damnjanovic et al. |
| 9,516,645 B2 | 12/2016 | Lin et al. |
| 9,572,148 B2 | 2/2017 | Park et al. |
| 9,629,133 B2 | 4/2017 | Rosa et al. |
| 10,419,196 B2 * | 9/2019 | Bendlin ............... H04L 5/0053 |
| 2011/0274074 A1 | 11/2011 | Lee et al. |
| 2012/0087331 A1 | 4/2012 | Seo et al. |
| 2012/0182948 A1 | 7/2012 | Huang et al. |
| 2013/0258986 A1 | 10/2013 | Seo et al. |
| 2013/0308519 A1 | 11/2013 | Gou et al. |
| 2014/0086118 A1 | 3/2014 | Wu et al. |
| 2014/0313985 A1 | 10/2014 | Nimbalker et al. |
| 2015/0029972 A1 | 1/2015 | Park et al. |
| 2015/0124638 A1 | 5/2015 | Sun et al. |
| 2015/0207700 A1 | 7/2015 | Elmdahl et al. |
| 2015/0341132 A1 | 11/2015 | Hwang et al. |
| 2016/0112902 A1 | 4/2016 | Huh et al. |
| 2016/0157118 A1 | 6/2016 | Liu et al. |
| 2016/0218853 A1 | 7/2016 | Takeda et al. |
| 2016/0234830 A1 | 8/2016 | Kim et al. |
| 2016/0255601 A1 | 9/2016 | Axmon et al. |
| 2016/0302229 A1 | 10/2016 | Hedayat |
| 2016/0323076 A1 | 11/2016 | Takeda et al. |
| 2017/0085356 A1 | 3/2017 | Lin et al. |
| 2018/0049236 A1 | 2/2018 | Sun et al. |
| 2018/0167946 A1 | 6/2018 | Si et al. |

FOREIGN PATENT DOCUMENTS

| | | |
|---|---|---|
| WO | 2010/143821 A2 | 12/2010 |
| WO | 2016/053164 A1 | 4/2016 |
| WO | 2016/134526 A1 | 9/2016 |
| WO | 2017/070948 A1 | 5/2017 |

OTHER PUBLICATIONS

Final Office Action received for U.S. Appl. No. 15/587,511 dated May 3, 2018, 22 pages.

Non-Final Office Action received for U.S. Appl. No. 15/587,511 dated Aug. 27, 2018, 22 pages.

Final Office Action received for U.S. Appl. No. 15/587,511 dated Jan. 2, 2019, 22 pages.

Notice of Allowance received for U.S. Appl. No. 15/587,511 dated May 2, 2019, 25 pages.

Wang et al.,"Analysis of carrier deployment strategies for ltea HetNets with multicell cooperation" Vehicular Technology Conference (VTC Fall), 2014 IEEE 80th. IEEE, 2014. https://www.researchgate.net/profile/Hua_Wang88/Publication/289703421_Analysis_of_Carrier_Deployment_Strategies_for_L TEA_HetNets with_Multicell_Cooperation/links/573f210908ae298602e8eb84.pdf. Retrieved on May 26, 2017, 5 pages.

Wang et al., "Uplink intersite carrier aggregation between macro and small cells in heterogeneous networks" Vehicular Technology Conference (VTC Fall), 2014 IEEE 80th. IEEE, 2014.https://www.researchgate.net/profile/Hua_Wang88/publication/286562217_Uplink InterSite Carrier_ Aggregation_ between_ Macro_ and_ Small_ Cells in_Heterogeneous_Networks/links/573f215e08ae9ace84133c03.pdf. Retrieved on May 26, 2017, 5 pages.

Khan et al. "Carrier aggregation/channel bonding in next generation cellular networks: Methods and challenges." IEEE Network 28.6 (2014): 3440.https://halinstitutminestelecom.archivesouvertes.fr/hal01109630/document. Retrieved on May 26, 2017, 19 pages.

Xiao et al. "Spatial spectrum sharingbased carrier aggregation for heterogeneous networks" Global Communications Conference (GLOBECOM), 2012 IEEE. IEEE, 2012. https://pdfs.semanticscholar.org/16f3/c44d467a26cbe9a9e4bf097eca1352b8822b.pdf. Retrieved on May 26, 2017, 6 pages.

* cited by examiner

VIRTUAL CARRIER AGGREGATION FOR WIDEBAND OPERATION OF WIRELESS COMMUNICATION SYSTEMS

RELATED APPLICATION

The subject patent application is a continuation of, and claims priority to, U.S. patent application Ser. No. 15/587,511 (now U.S. Pat. No. 10,419,196), filed May 5, 2017 and entitled "VIRTUAL CARRIER AGGREGATION FOR WIDEBAND OPERATION OF WIRELESS COMMUNICATION SYSTEMS," the entirety of which application is hereby incorporated by reference herein.

TECHNICAL FIELD

The subject disclosure relates generally to wireless communication systems in general, and to fifth-generation cellular wireless communications systems in particular that operate with very wide bandwidth.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
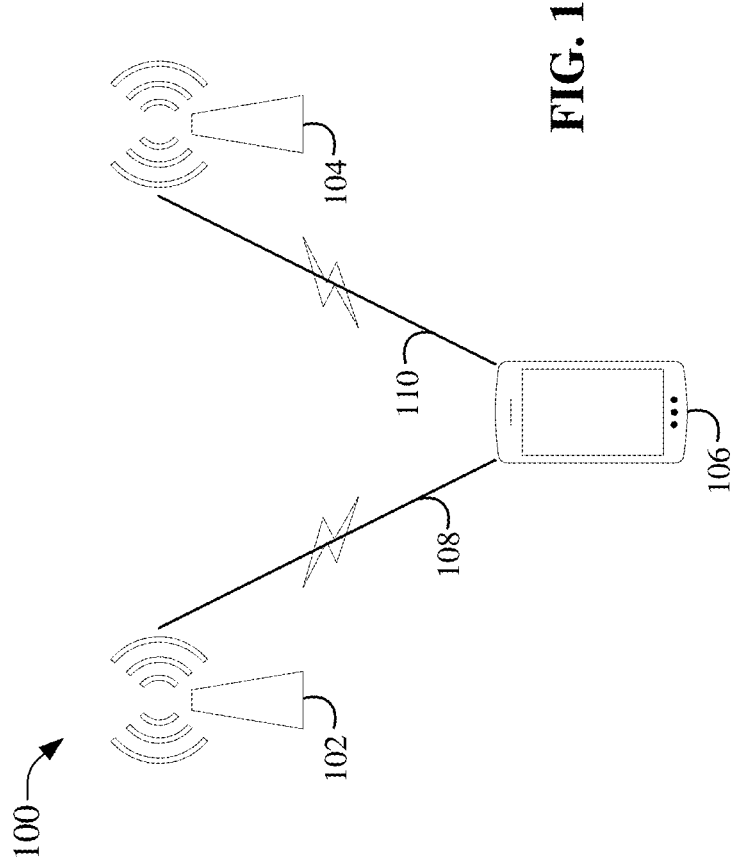
FIG. 1 illustrates an example, non-limiting communications system for virtual carrier aggregation for wideband operation of wireless communication systems.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

In the Third Generation Partnership Project (3GPP) Long-Term Evolution (LTE) standard, carrier aggregation (CA) was introduced in LTE Release 10. Since the capacity C of a wireless channel scales with $C=W \log(1+SNR)$, where W and SNR are the bandwidth and the signal-to-noise ratio, respectively, the easiest way to increase capacity is to increase bandwidth and/or signal-to-noise ratio. For instance, by decreasing the cell size of a cellular wireless communications system, the transmitter and receiver move closer together which effectively reduces the coupling loss, thereby increasing the signal-to-noise ratio. Thus, in modern cellular wireless communication systems, small cells are deployed in addition to macro cells with increasingly smaller inter-site distances, both of which significantly increase the capacity of the system.

Similarly, cellular wireless communication systems have evolved from narrowband systems to systems with wider bandwidth. For instance, the second generation Global System for Mobile communication (GSM), which uses 180 kHz (kilo Hertz) carrier bandwidth, was replaced by the third generation Universal Mobile Telecommunications Service (UMTS), which uses 5 MHz (Mega Hertz) carrier bandwidth, which itself was replaced by the fourth-generation LTE system which uses up to 20 MHz carrier bandwidth. By increasing the carrier bandwidth from generation to generation, huge increases in system and user throughput have been achieved and observed in real-world deployments.

In order to increase the bandwidth beyond the 20 MHz carrier bandwidth of LTE, the LTE-Advanced standard specifies a feature called carrier aggregation (CA). CA allows aggregation of up to five component carriers (CCs) for a total bandwidth of up to 100 MHz. From a physical layer perspective, all component carriers are basically identical. For example, all CCs transmit a primary and secondary synchronization signal (PSS/SSS), physical broadcast channel (PBCH), system information (SI), and so forth. This is to allow any and all CCs to act like a regular LTE carrier of up to 20 MHz band with. For example, the network may choose to distribute the users in the network evenly across all CCs for load-balancing purposes.

From a protocol perspective, each CC can also behave like a cell. This makes sense as each CC transmits PSS/SSS and cell-specific reference signals (CRS), PBCH, and SI data. For instance, a user equipment (UE) device can be configured to be allowed to attach to each of the CCs as its primary cell. The primary cell can be defined as a cell on which the user equipment device camps in idle mode and on which it receives the PBCH and SI data. After receiving the PBCH and the SI data, the user equipment device knows the random access channel (RACH) configuration of the cell which allows it to initiate a RACH procedure on the primary component carrier (PCC)—the CC defined as the primary cell (PCell). The RACH procedure encompasses the user equipment device sending a preamble (message 1) on the physical random access channel (PRACH), whereupon a device associated with a network of devices (e.g., one or more base station devices, such as next generation NodeB device (gNB) devices, and the like) responds with a random access response (RAR) in a response message (message 2) which can contain amongst other things an uplink (UL) grant for the user equipment device's first transmission in a further message (message 3) on the physical uplink shared channel (PUSCH). After contention resolution, the user equipment device is then connected to the network of networked device and can receive its radio resource control (RRC) configuration. Being RRC connected to the PCell also entails that the user equipment device monitors for physical downlink control channel (PDCCH) transmissions in its cell that may schedule data transmissions on the physical downlink shared channel (PDSCH) or the PUSCH. Hence, bi-directional communication has been established between the network device and the user equipment device.

As part of the networks (e.g., the network of networked devices) radio resource management (RRM), the device associated with the network of devices can then configure the user equipment device with additional CCs—secondary component carriers (SCCs)—wherein each SCC represents a secondary cell (SCell). All secondary cells (SCells) can be jointly scheduled, however, each secondary cell can have its own independent hybrid automatic repeat request (HARQ) procedure, adaptive modulation and coding (AMC), forward error correction (FEC), and the like. In other words, even though the medium access layer is jointly scheduled for all CCs, each CC is treated as an independent cell with independent HARQ processes. Aggregation of component carriers (CCs) occurs above the medium access control (MAC) layer at the radio link control (RLC) layer.

The existing implementation of CA has several inefficiencies. For example, all component carriers always transmit primary and secondary synchronization signals (PSS/SSS) even if the different CCs are processed by the user equipment device with a single Fast Fourier Transform (FFT). More particularly, in contiguous or noncontiguous intra-band carrier aggregation the frequency spacing between two CCs can be such that the user equipment device can infer from the PSS/SSS on one CC the timing and frequency offset of the other CC. In such a scenario, it can therefore be unnecessary to transmit PSS/SSS on all carriers.

Further inefficiencies can be caused because all carriers are effectively treated as stand-alone carriers, the user equipment device typically always assumes that PBCH and SI data is transmitted on a SCC. For instance, when a network device of network devices adds a SCell to the RRC configuration of the user equipment device, the network device provides all the system information for that cell via the RRC configuration message data that configures the SCell at the user equipment device. In addition, the user equipment device assumes that data representing the system frame number (SFN) is aligned among all its serving cells (e.g., PCells and SCells). Hence, the user equipment device can transmit and receive on a SCell without ever having to read the PBCH and SI data transmitted on that cell. Nevertheless, even if a given carrier is configured as a SCC for all user equipment devices connected to that carrier, the network device of network devices must still rate match its PDSCH transmissions around the resources reserved for PBCH transmissions. Similarly, the network device of network devices also has to provision at least one orthogonal frequency division multiplex (OFDM) symbol for common control channel transmissions.

Additionally, because each SCell is basically treated as a carrier, unnecessary guard bands can have been provisioned between CCs that are contiguous within the same band. The current design also requires fixed "carrier bandwidths" that do not necessarily scale as hardware and radio frequency (RF) capabilities evolve to support ever increasing bandwidths of a single carrier. In particular, the current design forces high capability user equipment devices that support wide bandwidths to operate as many carriers with smaller bandwidths (hence "carrier aggregation"). This segmentation into carriers then also introduces inefficiencies in the RRC signaling design as one chunk of continuous spectrum gets divided and sub-divided into many component carriers that, from a protocol perspective can all be independent cells, when in reality they are controlled by a single MAC/RLC, and only the HARQ is independent per CC which is clearly a HARQ feature not a MAC/RLC/RRC property.

In order to overcome the foregoing inefficiencies, the subject disclosure provides methods for: an efficient signaling design in the downlink control information to unify the design of coordinated multi-point transmissions, multi-slot transmissions and wide bandwidths transmissions; coordination between a transmitter and a receiver to harmonize design of wide bandwidth transmission for user equipment devices with different radio frequency (RF) capabilities; and efficient and interference aware channel state information and radio resource management measurements.

In achieving its aims, the subject disclosure addresses the following shortcomings in the current carrier aggregation (CA) design: (i) virtual carrier aggregation is achieved by treating wide bandwidths as a single carrier—rather than dividing and subdividing them into many carrier segments that are subsequently aggregated; (ii) the disclosed virtual carrier aggregation design maintains the most important properties and benefits of the traditional carrier aggregation design, namely independent HARQ processes for the virtual component carriers/subbands; (iii) efficient signaling design of scheduling the independent HARQ processes in a wide bandwidth; (iv) energy-efficient and interference aware transmission of common signals and channels; (v) unified design of coordinated multi-point transmissions, multi-slot transmissions, and wide bandwidths transmissions; (vi) harmonized design of wide bandwidth transmission for user equipment devices with different radio frequency (RF) capabilities; and (vii) minimized measurement gaps for inter-frequency measurements for efficient radio resource management (RRM).

FIG. 1 illustrates a system 100 for virtual carrier aggregation for wideband operation of wireless communication systems in accordance with an embodiment. As depicted system 100 depicts a coordinated multi-point (CoMP) transmission comprising a first transmission/reception point (TRP) device 102 and a second transmission/reception point (TRP) device 104, each of the first transmission/reception point (TRP) device 102 and the second transmission/reception point (TRP) device 104 can be communicatively coupled to a user equipment device 106 via a first wireless communication link 108 and a second wireless communication link 110. In instances where user equipment device 106 supports non-coherent joint transmission (NC-JT), user equipment device 106 can receive one or more control messages that schedule two PDSCH transmissions, one on the first wireless communication link 108 and one on the second wireless communication link 110 in the same transmission time interval (TTI), e.g., a slot of the 3GPP New Radio (NR) wireless communications standard. In this instance, the two transmissions are said to be space-division multiplexed (SDM).

Figure 2:
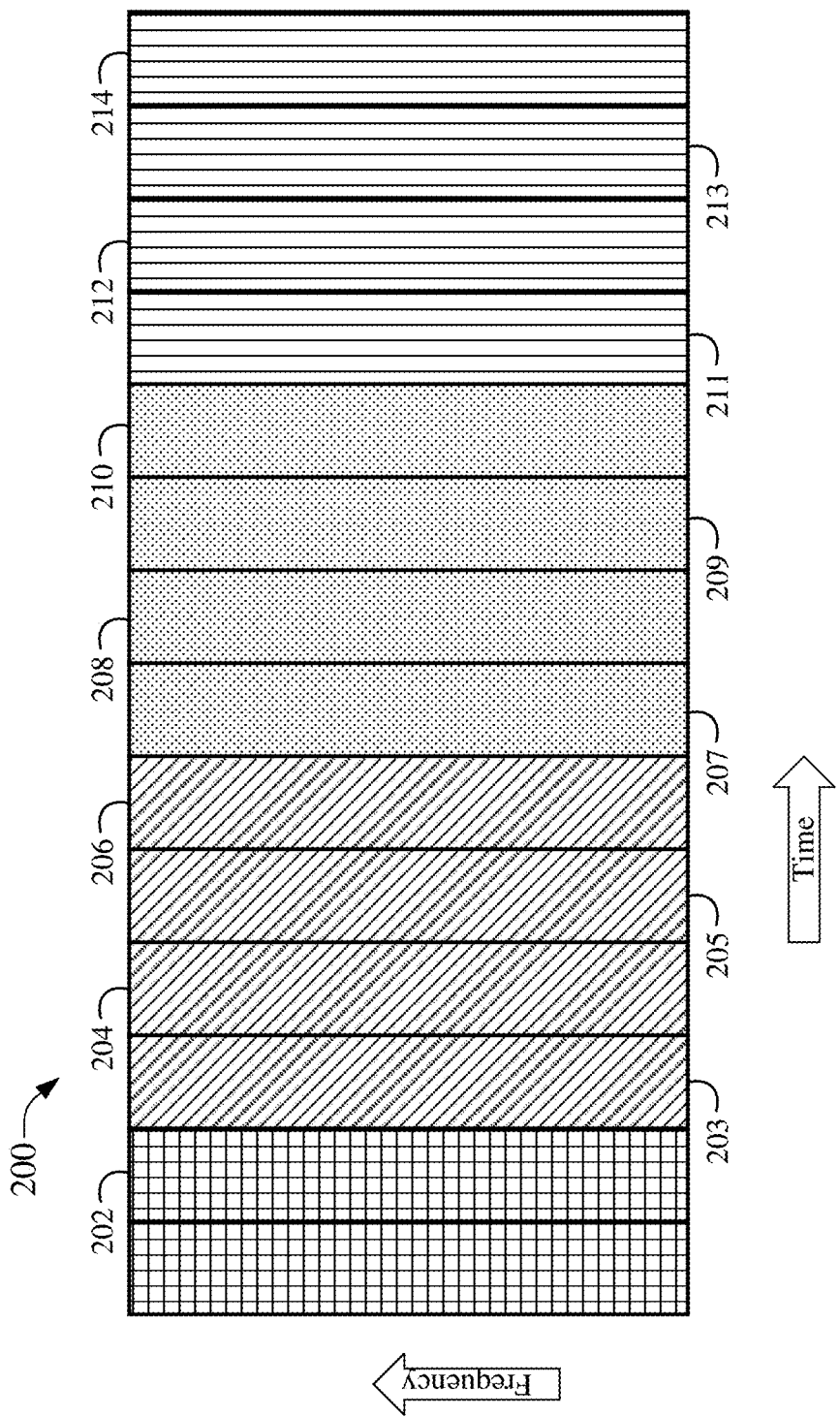
FIG. 2 illustrates an example, non-limiting example of time-division multiplexed Transmission Time Intervals (TTIs) as perceived at a user equipment device and in accordance with one or more embodiments described herein.

Alternatively and/or additionally, multiple transmission time intervals (TTIs) may be time-division multiplexed (TDM), as illustrated in FIG. 2, wherein a single control region configured on OFDM symbols 201 and 202 schedules three consecutive transmission time intervals on OFDM symbols {203, 204, 205, 206}, {207, 208, 209, 210}, and {211, 212, 213, 214}, respectively. Additionally and/or alternatively, the time-division multiplexing of transmissions can occur on a slot level where a common control region schedules multiple consecutive or non-consecutive slots jointly (not depicted).

Figure 3:
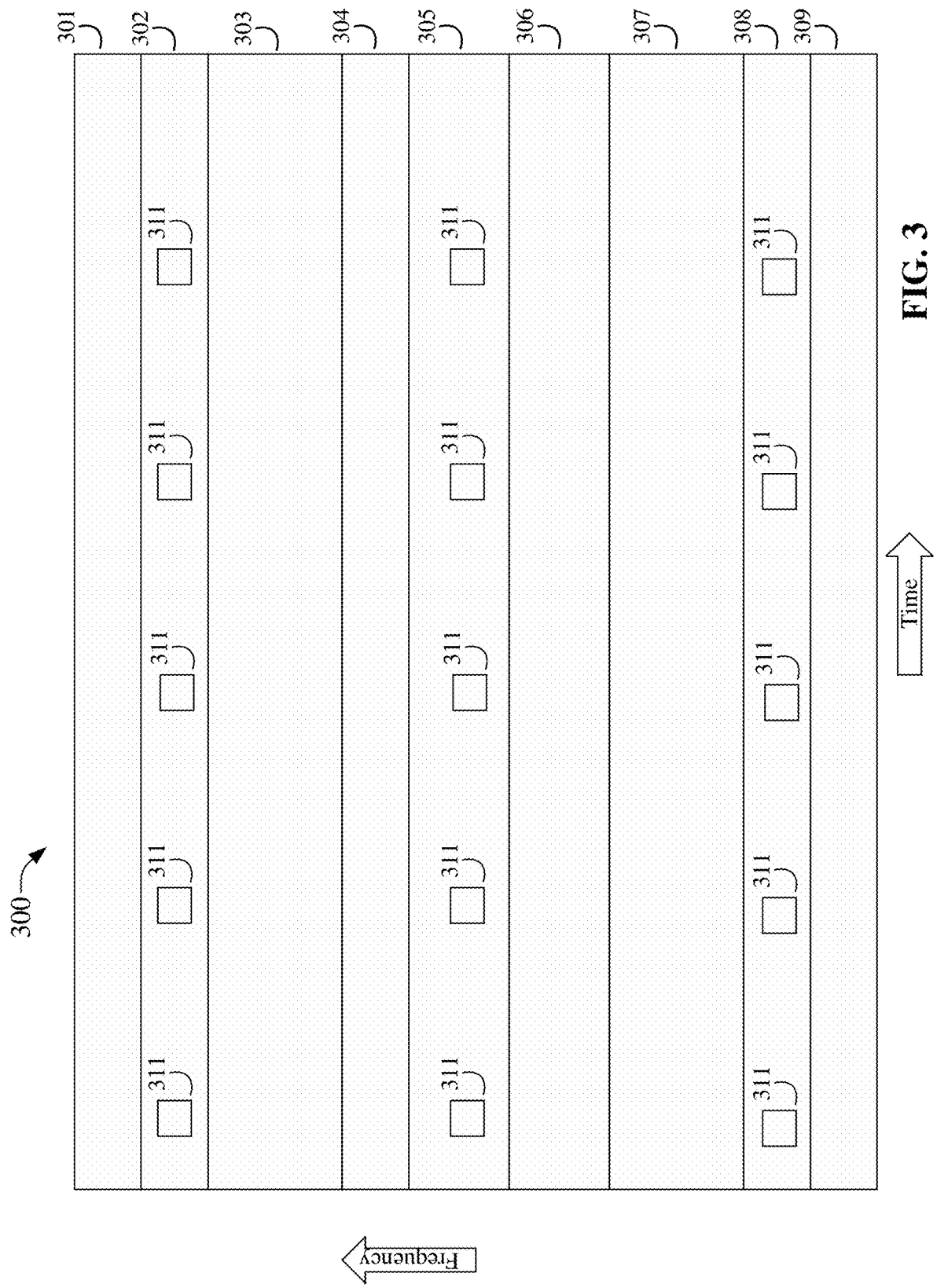
FIG. 3 illustrates an example, non-limiting wide bandwidth allocation partitioned into multiple smaller subbands in accordance with one or more embodiments described herein.

Additionally and/or alternatively, a wide bandwidth may be partitioned into smaller logical subbands 301-309 as depicted in FIG. 3, wherein independent downlink and uplink transmissions (e.g., on the PDSCH/PUSCH) can be scheduled on each logical subband using independent HARQ processes, AMC, FEC and so forth. In such an instance, the transmissions are said to be frequency-division multiplexed (FDM).

As illustrated in FIG. 3, different user equipment devices (e.g., user equipment device 106) can have different hardware capabilities. For example, some low complexity user equipment devices (e.g., user equipment device 106) may only be able to transmit or receive on a single subband at any given time. Other user equipment devices (such as user equipment device 106), however, may be able to transmit/receive on a subset of subbands at any given time. Yet other user equipment devices (e.g., user equipment device 106) may be able to transmit/receive on all subbands at any given time.

Among the user equipment devices (e.g., user equipment device 106) able to transmit/receive on all or a subset of subbands, some may do so using multiple FFTs in an orthogonal frequency-division multiplexing (OFDM) based communications system, whereas others may have hardware and RF components that support all subbands with a single FFT implementation. In either case, the user equipment device (e.g., user equipment device 106) may use a single or multiple radio frequency receivers each including a chain of radio frequency components such as down converters and analog-to-digital converters (ADC). In regard to base station devices, such as next-generation NodeBs (gNBs) in the New Radio (NR) access network or any other wireless communication network, those base stations devices that are able to transmit/receive on all or a subset of subbands, some may do so using multiple FFTs in an orthogonal frequency-division multiplexing (OFDM) based communications system, whereas other base station devices may have hardware and RF components that support all subbands with a single FFT implementation. Nonetheless, base station device hardware and RF components can support a very large bandwidth of several hundred or thousand MHz, whereas all or some of the user equipment devices (e.g., user equipment device 106) may only support smaller bandwidths of several tens or hundred MHz.

Figure 4:
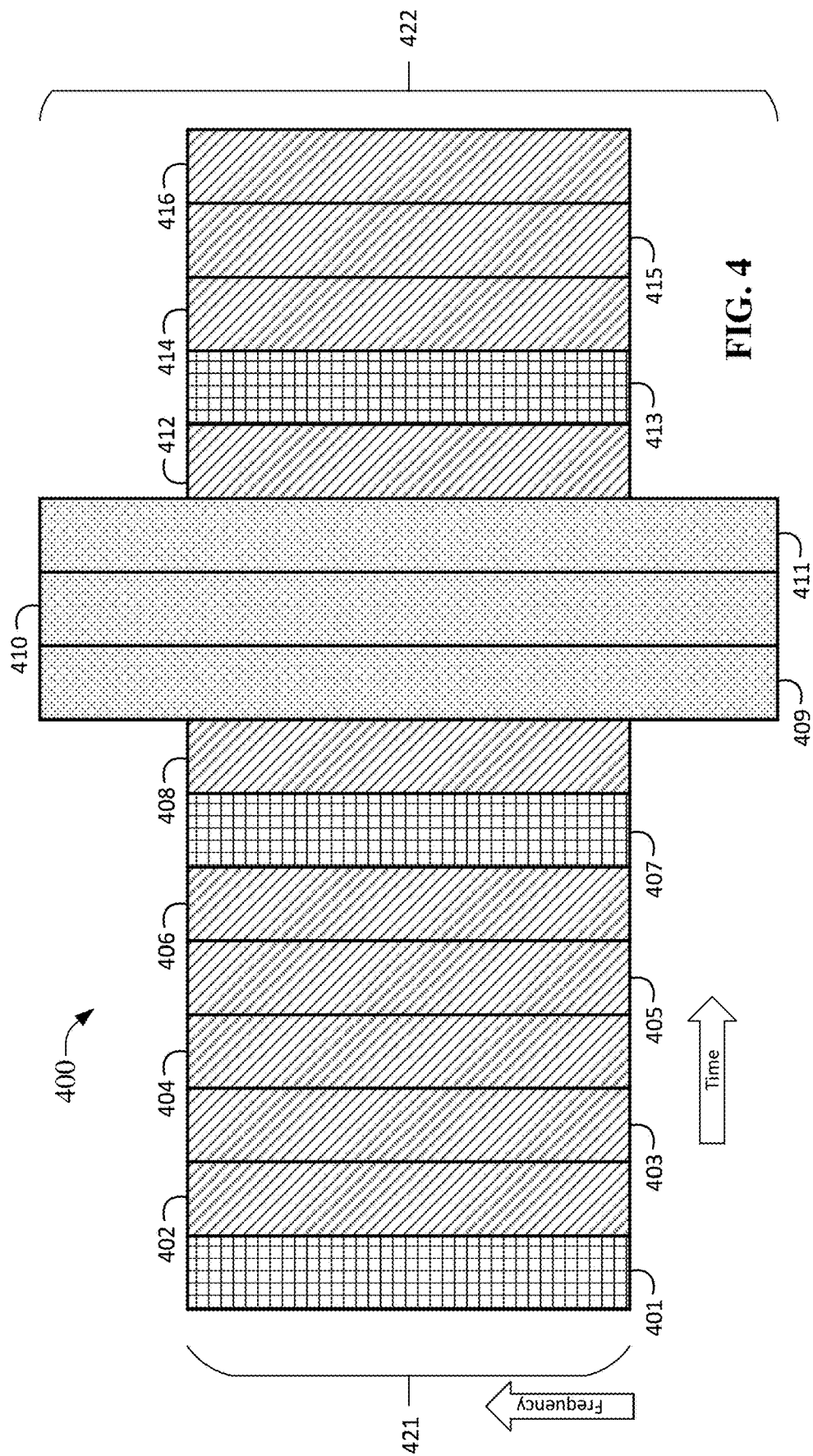
FIG. 4 illustrates an example, non-limiting dynamic bandwidth adaptation in accordance with one or more embodiments described herein.

Further, in connection with next-generation radio access networks, such as the 3GPP NR feature that enables enhanced bandwidth adaptation mechanisms for advanced energy savings at the user equipment device (e.g., user equipment device 106) receivers, and in reference to FIG. 4, a user equipment device 106 can be configured to receive downlink transmissions including downlink control information (DCI), PDSCH and reference signals (RS) for channel state information acquisition (CSI-RS) or RRM purposes in a first small bandwidth 421. On OFDM symbol 401, for example, the user equipment device 106 can receive DCI scheduling it to receive PDSCH data on symbols 402-406. In the meantime, if a large data packet arrives in the gNB MAC scheduler associated with a transmission/reception point (e.g., first and/or second TRPs 102 and/or 104), the gNB MAC scheduler indicates, for instance, in the DCI transmitted on symbol 407 that the user equipment device receiver should expand its RF bandwidth represented as 421 to a larger bandwidth represented as 422 for transmission of the large data packet on a PDSCH on symbols 409-411.

In accordance with an embodiment, the bandwidth adaptation feature illustrated in FIG. 4 can be implemented using the subband concept depicted in FIG. 3. More particularly, one of the subbands 301-309 depicted in FIG. 3 can be configured as bandwidth 421 (illustrated in FIG. 4), whereas bandwidth 422 (depicted in FIG. 4) can be an aggregation of multiple subbands 301-309 (illustrated in FIG. 3). A subband can comprise a center frequency and a minimum and maximum frequency. The center, minimum and maximum frequency can be configured per subband or, alternatively, the center, minimum and maximum frequency can be derived, for example, by configuring the physical resource blocks comprising each subband. The physical resource blocks in one subband can be defined as a set of resource blocks or can be defined as a minimum and maximum resource block and all resource blocks in between can be understood to be part of the subband. As will be appreciated by persons having ordinary skill in the art, other signalling mechanisms are not necessarily precluded. When the gNB signals to the UE either dynamically or semi-statically (e.g., in the DCI, MAC header, or via RRC) to expand (or respectively shrink) the bandwidth from 421 to 422 (from 422 to 421 respectively), as depicted in FIG. 4, the old and new bandwidths are always defined as aggregations of subbands and neither 421 nor 422 can span partial subbands.

In accordance with an additional embodiment, network devices, such as first transmission/reception point (TRP) device 102 and/or second transmission/reception point (TRP) device 104, can configure different subbands as bandwidth 421 for disparate user equipment devices. For instance, one user equipment device (e.g., user equipment device 106) may monitor for DCI on subband 302, while another user equipment device (e.g., user equipment device 106) can monitor for DCI on subband 305, while yet another user equipment device (e.g., user equipment device 106) can monitor for DCI on subband 308.

In accordance with yet another embodiment, user equipment devices (e.g., user equipment device 106) can receive PSS/SSS/PBCH/SI (e.g., namely all common signals and channels) on a given subband, for example, subband 305. After the RRC connection is established, the network device (e.g., first and/or second transmission/reception point (TRP) devices 102 and/or 104) can configure a new subband for the user equipment device (e.g., user equipment device 106). The user equipment device (e.g., user equipment device 106) can thereafter cease to monitor for DCI on the first subband where it received the common signals and channels and can start monitoring for DCI on the new subband. In one example, the new subband can also transmit at least some common signals, such as PSS/SSS. Additionally and/or alternatively, the new subband may not transmit common signals and channels.

In instances of a radio link of failure (RLF) the user equipment device (e.g., user equipment device 106) can transmit a PRACH on the old or the new subband. Alternatively, user equipment device 106 can send the PRACH only on either the old or the new subband. Similarly, the UE may monitor for the RAR on both the old and new carrier. Alternatively, user equipment device 106 monitors for the RAR on the carrier where it sent the PRACH. In yet another example, user equipment device 106 transmits the PRACH on the new carrier but monitors for the RAR on the old carrier. When user equipment device 106 goes into discontinuous reception (DRX) mode to conserve battery power and/or RRC idle mode user equipment device 106 can either do so on the old subband or, alternatively, the network device may configure the carrier on which user equipment device 106 monitors for DCI in DRX or RRC idle mode.

When user equipment device 106 is in RRC connected mode on a given subband, it may be configured to perform RRM and/or CSI measurements on a different subband. In cases where user equipment device 106 is configured to monitor for DCI or receive PDSCH transmissions on one or more subbands and is also instructed to measure RRM and/or CSI on one or more other subbands, the network device does not transmit DCI and/or PDSCH to user equipment device 106 on subbands configured for user equipment device 106 to receive DCI and/or PDSCH on. This is to allow the user equipment device RF frontend to tune to one or more other subbands and measure CSI and/or RRM. The subbands for CSI and/or RRM measurement can be dynamically indicated to user equipment device 106 in the DCI or MAC control elements.

Alternatively, subbands for CSI and/or RRM measurement can be semi-statically configured at user equipment device 106 together with time resources in which to perform the measurements on the subbands together with any other necessary information such as the configuration of the RS used for the actual measurement. Note that the scheduling restriction for measuring CSI and/or RRM on a subband not configured for PDSCH/DCI reception is expected to be much shorter than in LTE. For example, a single slot duration may suffice where user equipment device 106 tunes to the subband for measurement during the beginning of a slot, measures in the middle of a slot, and retunes to the subbands configured for PDSCH/DCI reception at the end of a slot. User equipment device 106 may have to switch subbands for RRM purposes (e.g., when neighboring cells transmit the PSS/SSS or any other RS for RRM purposes on subbands other than the ones configured for PDSCH/DCI reception). The subbands can be configured to user equipment device 106 as part of a measurement configuration via RRC signalling or may be indicated as part of the system information. Similarly, the gNB scheduler may want to know CSI or RRM information for subbands not configured for PDSCH/DCI reception to check whether better channel conditions can be found on these subbands in order to increase robustness and spectral efficiency of the PDSCH/DCI transmissions. While retuning and the associated scheduling restrictions decrease the spectral efficiency on a given subband, overall system efficiency may be increased.

For example, user equipment device 106 can harness significant power savings by configuring a small RF bandwidth which can be retuned to multiple subbands rather than configuring a wide RF bandwidth that allows to receive PDSCH/DCI on some subbands and to measure for RRM/ CSI purposes on other subbands. Similarly, from the perspective of network devices such as access points and base stations, not transmitting PSS/SSS on all subbands allows for energy savings and interference coordination between cells. This is also beneficial in the case of operation on shared (e.g. LTE-NR coexistence) or unlicensed spectrum where multiple cells may need to dynamically adapt their occupied bandwidth based on different factors such as traffic, interference, or listen-before-talk (LBT) requirements.

The foregoing subband based design can also be combined with the SDM and TDM deployments depicted in FIG. 1 and FIG. 2. In all three cases (SDM, TDM, FDM) user equipment device 106 can receive multiple PDCCH and/or PDSCH from different transmission points, in different TTIs, or in different subbands, respectively. In either case, the DCI carried on one or more PDCCH scheduling the multiple PDSCH/PUSCH transmissions needs to indicate for each PDSCH/PUSCH from/in/on which TRP/TTI/subband the PDSCH/PUSCH is transmitted.

In accordance with the foregoing and in an embodiment, a single field in the DCI can jointly indicate the TRP, TTI and subband of a transmission. In other words, the TRP, TTI and subband can be jointly encoded. The TRP can, for example, be indicated by associating a defined quasi-colocation (QCL) behavior with the transmission that the DCI schedules. The TTI can, for instance, be indicated by a slot index or by the OFDM symbols it spans. And the subband can be indicated by a subband index. These examples are for illustration, not limitation purposes.

In an additional embodiment, user equipment device 106 can be semi-statically configured by RRC to either TDM, FDM or SDM the multiple transmissions. Hence, a single DCI field either indicates the defined QCL behavior, TTI, or subband.

In yet a further embodiment, separate fields can be configured in the DCI for the SDM, TDM, and FDM behavior of user equipment device 106. For example, one DCI field can indicate the defined QCL behavior, another field can indicate the time resources of the transmission and a third field can indicate the subband for the transmission. Furthermore, combinations of the above signaling methods are possible.

As noted above, one feature of the disclosed subband based design is that each subband has its own HARQ processes. For example, different subbands can experience different channel conditions allowing a gNB scheduler, located in a network device such as the first TRP device 102 and/or the second TRP device 104, to adapt the modulation and coding scheme separately for each subband and in accordance with the channel conditions as reported by the user equipment in the CSI per subband.

Thus, in accordance with an embodiment, the network (and associated network devices) does not treat the subbands as individual entities in the scheduler. Rather the subbands represent a certain implementation at user equipment device 106. As observed above, the network can support a large bandwidth with a single RF front-end and FFT, whereas some or all user equipment devices can have separate RF front-ends each supporting a smaller bandwidth with a separate FFT. In one example, the specific user equipment device implementation (e.g., whether a wide bandwidth is implemented by one or multiple FFTs) is agnostic to the network. For example, a user equipment device can implement a single large bandwidth by multiple FFTs without any guard bands and the network may schedule any subcarrier (or groups thereof, namely, physical resource blocks) without restrictions arising from the user equipment device implementation. In the downlink, after FFT processing, the user equipment device concatenates the subcarriers from the various FFTs to a single time/frequency grid spanning the entire wide bandwidth assuming a single FFT. The user equipment device then performs symbol and bit level processing and decodes the data. In this case the user equipment device may obtain time/frequency synchronization (e.g. based on PSS/SSS) in one bandwidth spanned by a single FFT, but applies the same timing across the remaining FFTs in order to ensure a common alignment across the entire bandwidth as would be obtained with a single FFT.

In accordance with an additional embodiment, the user equipment device RF implementation is not agnostic to the network (e.g., the network knows about the partitioning of the wide bandwidth at user equipment device 106 into multiple RF front-ends and FFTs). For example, one or more network device of network devices can choose one out of several partitions via RRC signalling or system information broadcast where the set of all allowed partitions is fixed via specifications. This may be helpful if user equipment device 106 cannot implement the multiple FFTs with zero guard bands in between. Alternatively, user equipment device 106 can signal to the one or more network device of network devices its portioning during RRC connection setup. When the one or more network device of network devices schedules downlink and uplink transmissions, the one or more network device of network devices can then take the partitioning into account and rate match the PDSCH and PUSCH accordingly. Similarly, the one or more network device of network devices can map wideband RS such as CSI-RS accordingly.

Knowing how user equipment device 106 partitions a wide bandwidth into multiple RF front-ends/FFTs can also be beneficial for power savings at the UE. In the above example, where one or more network device of network devices can schedule transmissions in the wide bandwidth without restrictions since the rate matching behavior is known to both the transmitter and receiver including any guard bands (tones) between subbands, a given transmission may span two FFTs at the receiver. In this case, user equipment device 106 cannot turn one of the RF front-ends off as both are required to receive the allocation. Hence, by taking into account how user equipment device 106 partitions the RF into FFTs, one or more network devices or network devices can schedule transmissions to be contained within a limited number of subbands thereby allowing user equipment device 106 to turn off other RF front-ends. This results in prolonged battery life at the user equipment device.

This partitioning at user equipment device 106 can be taken into account in the configuration and triggering of aperiodic or periodic CSI and RRM measurements at user equipment device 106. For example, a network of network devices can configure user equipment device 106 only with CSI/RRM measurements on a limited number of subbands at a time corresponding to the RF front-end/FFT implementation. The network of network devices can indicate to user equipment device 106 a semi-static pattern for switching between different subband or bandwidth partitions within the wideband carrier to enable measurement of the entire bandwidth over several measurement instances.

In the context of the first TRP device 102 and/or the second TRP device 104, illustrated in FIG. 1, these can be devices associated with a network devices such as access point devices or base station devices (e.g., home Node B (HNB) devices, home access point (HAP) devices, home eNodeB (HNBs) devices, evolved NodeB (eNodeB) devices, next generation NodeB devices (gNBs), and the like). As will be appreciated devices associated with a network of devices, such as access point devices or base station devices (e.g., first TRP device 102 and/or second TRP device 104), for purposes of elucidation, can comprise any type of mechanism, machine, device, facility, apparatus, and/or instrument inclusive of a processor, and/or is capable of effective and/or operative wired and/or wireless communication with a network topology. Illustrative mechanisms, machines, apparatuses, devices, facilities, and/or instruments can include server class computing machines and/or databases, tablet computing devices, handheld devices, laptop computers, notebook computers, desktop computers, cell phones, smart phones, consumer appliances and/or instrumentation, industrial devices and/or components, devices and/or appliances associated with aerospace vehicles, consumer devices and/or components associated with automotive vehicles, handheld devices, personal digital assistants, multimedia Internet enabled phones, multimedia players, and the like.

In relation to user equipment device 106, user equipment device 106, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise user equipment device 106 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial appliances and/or instrumentation associated with automotive vehicles, industrial and/or consumer appliances and/or instrumentation associated with aerospace vehicles and/or satellites orbiting in low earth orbit, geosynchronous orbit, and the like.

Figure 5:
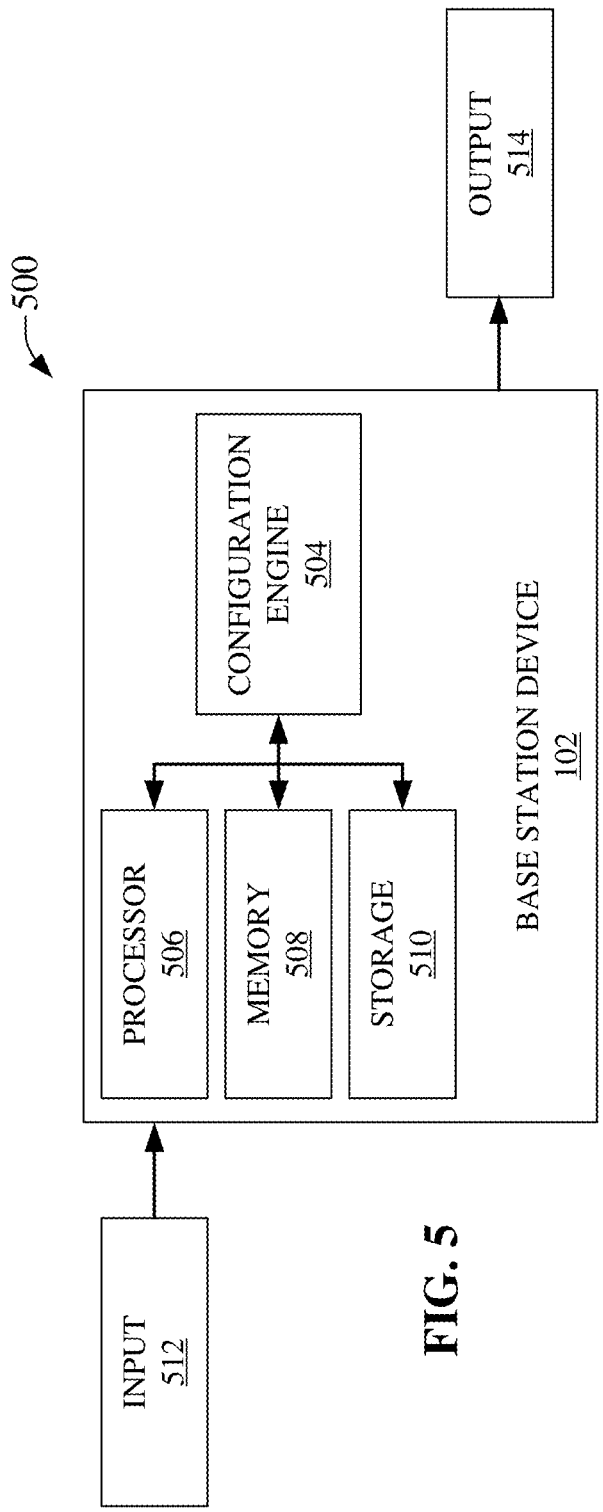
FIG. 5 illustrates an example, non-limiting system for virtual carrier aggregation for wideband operation of wireless communication systems in accordance with one or more embodiments described herein.

FIG. 5 provides illustration of a system 500 for virtual carrier aggregation for wideband operation of wireless communication systems, in accordance with an embodiment. System 500 can comprise base station device 502 that for purposes of illustration, can be any type of mechanism, machine, device, facility, apparatus, and/or instrument that includes a processor and/or is capable of effective and/or operative communication with a wired and/or wireless network topology. Base station device 502 can be a network device of a plurality of network devices that can form a multicarrier wireless network infrastructure, and further can perform the functionalities and facilities described above in regard to FIGS. 1-4. Mechanisms, machines, apparatuses, devices, facilities, and/or instruments that can comprise base station device 502 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial appliances and/ or instrumentation associated with automotive vehicles, industrial and/or consumer appliances and/or instrumentation associated with aerospace vehicles and/or satellites orbiting in low earth orbit, geosynchronous orbit, and the like.

Base station device 502 can comprise configuration engine 504 that can be in operative communication with processor 506, memory 508, and storage 510. Configuration engine 504 can be in communication with processor 506 for facilitating operation of computer-executable instructions or machine-executable instructions and/or components by configuration engine 504, memory 508, for storing data and/or computer-executable instructions and/or machine-executable instructions and/or components, and storage 510 for providing longer term storage of data and/or machine-readable instructions and/or computer-readable instructions. Additionally, base station device 502 can also receive input 512 for use, manipulation, and/or transformation by configuration engine 504 to produce one or more useful, concrete, and tangible results, and/or transform one or more articles to different states or things. Further, base station 502 can also generate and output the useful, concrete, and tangible results and/or the transformed one or more articles as output 514.

In accordance with an embodiment configuration engine 504, as a function of receiving large packet data to be transmitted to a user equipment device communicatively associated with base station device 502, can partition a bandwidth allocation into a spectrum of one or more logical subbands based on a partitioning scheme. The logical subbands determined by configuration engine 504 can be of disparate sizes. Further, a group of the logical subbands can include synchronization symbols and channels that can include data representing primary and secondary synchronization signals (e.g., PSS/SSS), physical broadcast channel (PBCH) data, system information (SI) data, and the like, that can be used by a user equipment device to establish communications with base station device 502. Thereafter, configuration engine 504, based on the logical subbands identified and determined based on the petitioning scheme, can generate and thereafter send configuration data representing one or more subbands within the bandwidth allocation that will be used to transmit the large packet data to the user equipment device, as well as data representing the PSS/SSS, PBCH data, SI data, etc., that can be used by a user equipment device to initially establish a communication session with base station device 502. It will be noted in regard to the allocation of the spectrum of logical subbands within the bandwidth allocation, that for purposes of load balancing, for example, disparate user equipment devices associated with base station device 502 can each be assigned different and distinguishable logical subbands within the spectrum of logical subbands.

Figure 6:
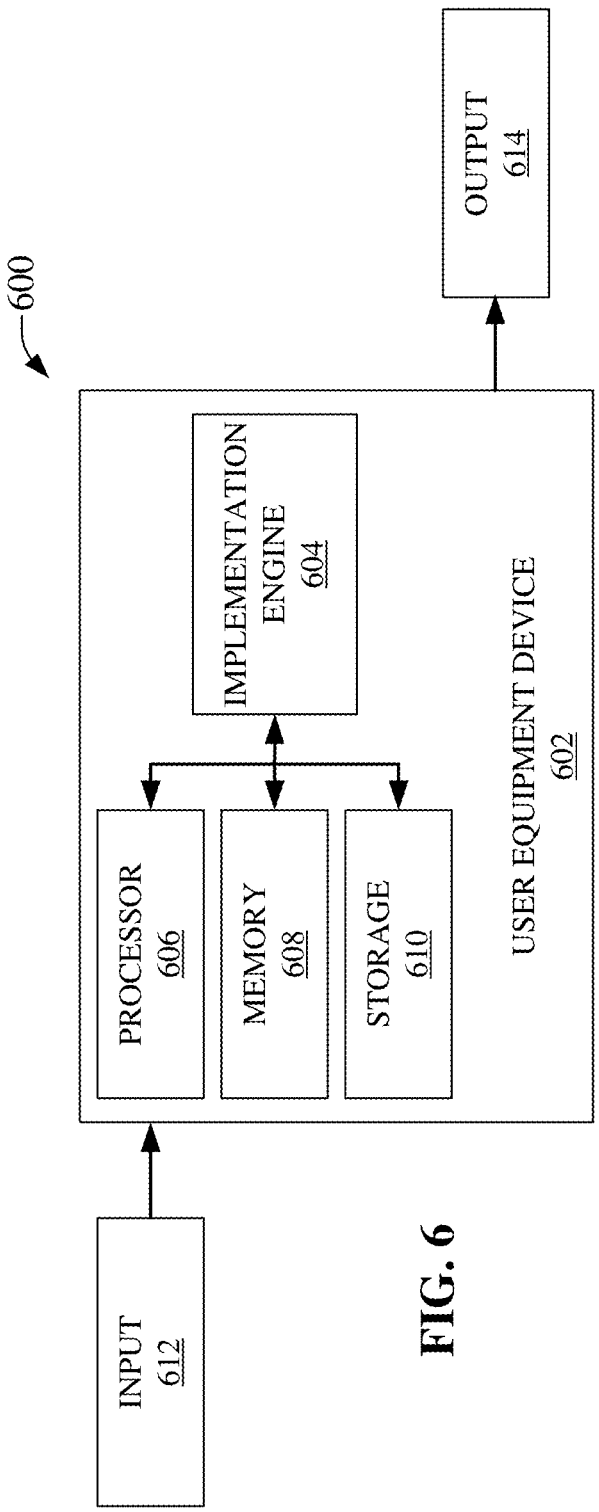
FIG. 6 illustrates an example, non-limiting system for virtual carrier aggregation for wideband operation of wireless communication systems in accordance with one or more embodiments described herein.

FIG. 6 depicts a system 600 for virtual carrier aggregation for wideband operation of wireless communication systems, in accordance with an embodiment. System 500 can comprise user equipment device 602 that for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise user equipment device 602 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial appliances and/or instrumentation associated with automotive vehicles, industrial and/or consumer appliances and/or instrumentation associated with aerospace vehicles and/or satellites orbiting in low earth orbit, geosynchronous orbit, and the like.

User equipment device 602 can comprise implementation engine 604 that can be in operative communication with processor 606, memory 608, and storage 610. Implementation engine 604 can be in communication with processor 606 for facilitating operation of computer-executable instructions or machine-executable instructions and/or components by implementation engine 604, memory 608, for storing data and/or computer-executable instructions and/or machine-executable instructions and/or components, and storage 610 for providing longer term storage of data and/or machine-readable instructions and/or computer-readable instructions. Additionally, user equipment device 602 can also receive input 612 for use, manipulation, and/or transformation by implementation engine 604 to produce one or more useful, concrete, and tangible results, and/or transform one or more articles to different states or things. Further, user equipment device 602 can also generate and output the useful, concrete, and tangible results and/or the transformed one or more articles as output 614.

Implementation engine 604 on receiving, for example, via input 612, data representing configuration data, such as primary and secondary synchronization signals (e.g., PSS/SSS), physical broadcast channel (PBCH) data, system information (SI) data, etc., from a base station device (e.g., base station device 502) can use the PSS/SSS, PBCH data, and SI data to establish an initial communication session with the base station device. Once user equipment device 602 using the functionalities and facilities associated with implementation engine 604 has established a communication session with the base station device, the base station device can convey additional configuration information to user equipment device 602. This additional configuration information can include radio parameters and radio settings required by the user equipment device 602 to receive large packet data from the base station device. In response to receiving the additional configuration information, implementation engine 604 can configure the radio parameters associated with user equipment device 602 to accommodate receiving the large packet data communicated from the base station device.

Figure 7:
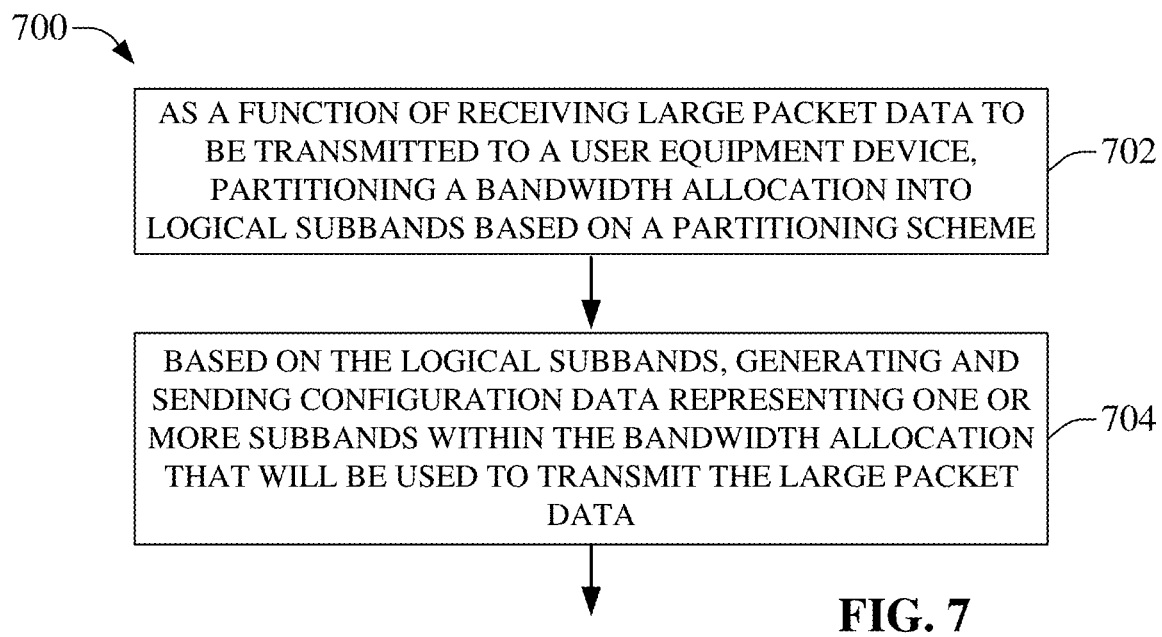
FIG. 7 illustrates a high-level example, non-limiting method for virtual carrier aggregation for wideband operation of wireless communication systems in accordance with one or more embodiments described herein.

FIG. 7 illustrates a method 700 for virtual carrier aggregation for wideband operation of wireless communication systems, in accordance with an embodiment. Method 700 can be implemented on a base station device, such as base station device 502, whereupon at 702 the base station device, as a function of receiving large packet data that is to be transmitted to a user equipment device, can partition a bandwidth allocation into one or more logical subbands based upon a defined partitioning scheme. At 704, the base station device, based on the logical subbands can generate and send configuration data representing at least the one or more subbands within the bandwidth allocation that will be utilized to transmit the large packet data to the user equipment device.

Figure 8:
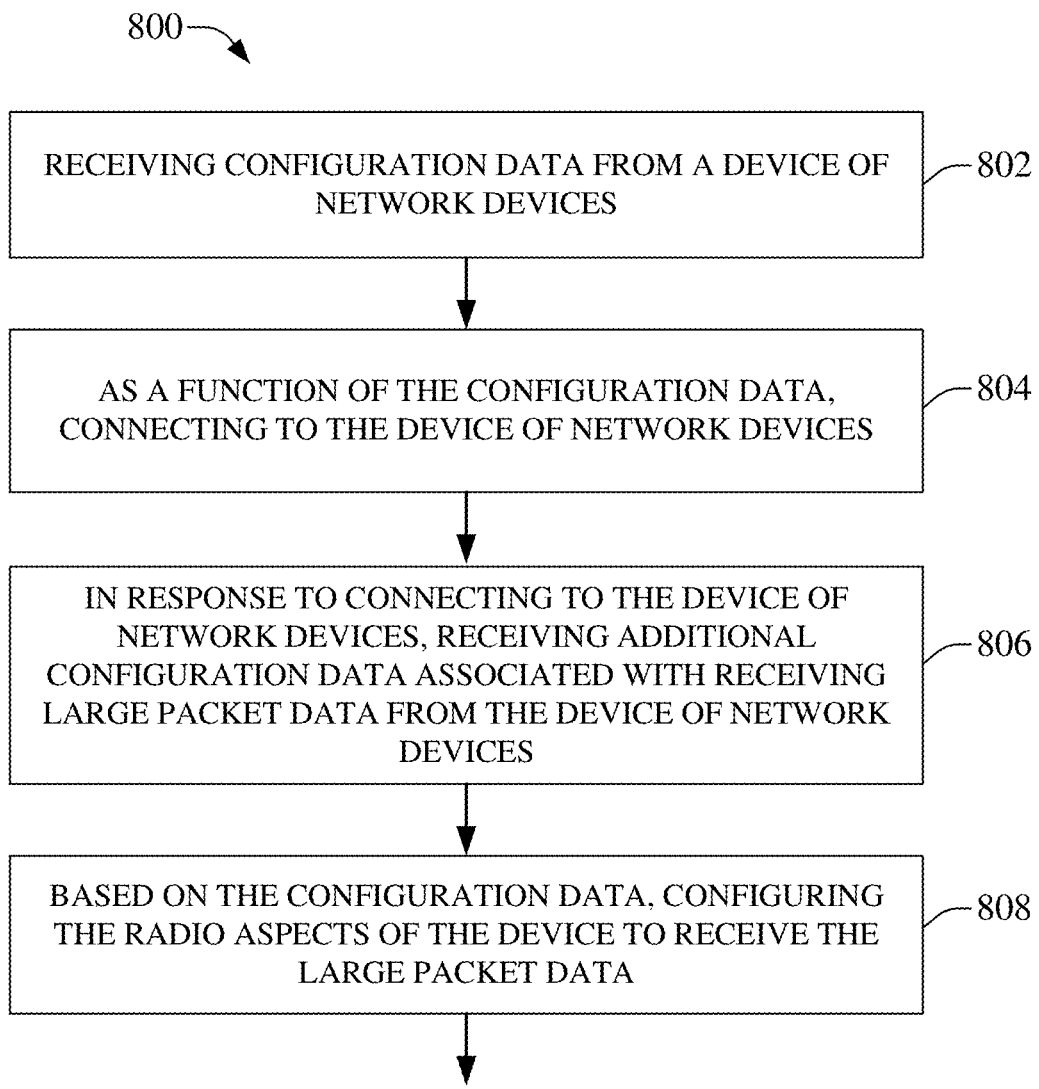
FIG. 8 illustrates an example, non-limiting method for virtual carrier aggregation for wideband operation of wireless communication systems in accordance with one or more embodiments described herein.

FIG. 8 depicts a method 800 for virtual carrier aggregation for wideband operation of wireless communication systems, in accordance with an embodiment. Method 800 can be implemented by a user equipment device, such as user equipment device 602, whereupon at 802 the user equipment device can receive an initial configuration data from a network device of network of devices (e.g., base station device 502). At 804, the user equipment device, as a function of the initial configuration data received from the network device of the network of devices, can connect to the network device using data included in the initial configuration data. The initial configuration data can include primary and secondary synchronization signals (e.g., PSS/SSS), physical broadcast channel (PBCH) data, system information (SI) data, etc. At 806, in response to connecting to the network device, the user equipment device can receive additional configuration data associated with receiving large packet data from the network device. This additional configuration data can pertain to logical subbands that have been assigned by the base station device for the user equipment device to utilize during the download of large packet data from the base station device. At 808, based on the additional configuration data the user equipment device can configure the radio aspects of the user device to receive the large packet data.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as New Radio (NR) access. Accordingly, systems, methods, and/or machine-readable storage media for facilitating management of group common downlink control channels for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

In a described embodiment, a system can comprise a processor and a memory that stores machine-executable instructions and/or computer-executable instructions that, when executed by the processor, facilitate performance of operations. The operations can comprise receiving, from a network device of network devices, downlink transmission data comprising downlink control information applicable to a downlink channel of the network device; as a function of the downlink transmission data, adjusting a subband of subbands resulting in an aggregation of multiple subbands; and transmitting uplink radio traffic data via the aggregation of multiple subbands to the network device.

The downlink transmission data can further comprise physical downlink shared channel data; reference signal for channel state information acquisition data applicable to the downlink channel of the network device; and radio resource management data applicable to the downlink channel of the network device.

Additional operations can comprise receiving the downlink transmission data in a first subband of the subband of subbands; in response to the network device using an orthogonal frequency division multiplexing encoding scheme, receiving a first orthogonal frequency division multiplexing symbol representing the downlink control information (DCI) data in a first subband of the subband of subbands; and receiving a second orthogonal frequency division multiplexing symbol subsequent to the first orthogonal frequency division multiplexing symbol, and wherein the second orthogonal frequency division multiplexing symbol comprises physical downlink shared channel data.

In further described embodiment, a method that can comprise receiving, by a system comprising a processor, downlink transmission data comprising downlink control information applicable to a downlink channel of a network device of network devices; as a function of the downlink transmission data, adjusting, by the system, a subband of subbands resulting in an aggregation of multiple subbands; and transmitting, by the system, uplink radio traffic data via the aggregation of multiple subbands to the network device.

The downlink transmission data can further comprise physical downlink shared channel data; reference signal for channel state information acquisition data applicable to the downlink channel of the network device; and/or radio resource management data applicable to the downlink channel of the network device.

Further acts that can be performed by the method comprise receiving the downlink transmission data in a first subband of the subband of subbands; in response to the network device using an orthogonal frequency division multiplexing encoding scheme, receiving, by the system, a first orthogonal frequency division multiplexing symbol representing the downlink control information (DCI) data in a first subband of the subband of subbands; and receiving, by the system, a second orthogonal frequency division multiplexing symbol subsequent to the first orthogonal frequency division multiplexing symbol, and wherein the second orthogonal frequency division multiplexing symbol comprises physical downlink shared channel data.

In another embodiment, a machine-readable storage medium, comprising executable instructions that, when executed by a processor, facilitate performance of operations, is described. The operations can comprise: receiving, from a network device of network devices, downlink transmission data comprising downlink control information applicable to a downlink channel of the network device; as a function of the downlink transmission data, adjusting a subband of subbands resulting in an aggregation of multiple subbands; and transmitting uplink radio traffic data via the aggregation of multiple subbands to the network device.

The downlink transmission data can further comprise physical downlink shared channel data; reference signal for channel state information acquisition data applicable to the downlink channel of the network device; and/or radio resource management data applicable to the downlink channel of the network device.

Additional operations can comprise receiving the downlink transmission data in a first subband of the subband of subbands; in response to the network device using an orthogonal frequency division multiplexing encoding scheme, receiving a first orthogonal frequency division multiplexing symbol representing the downlink control information (DCI) data in a first subband of the subband of subbands; and receiving a second orthogonal frequency division multiplexing symbol subsequent to the first orthogonal frequency division multiplexing symbol, and wherein the second orthogonal frequency division multiplexing symbol comprises physical downlink shared channel data.

Further described are systems, methods, articles of manufacture, and other embodiments or implementations that can facilitate virtual carrier aggregation for wideband operation of wireless communication systems in a 5G network. Facilitating of virtual carrier aggregation for wideband operation of wireless communication systems in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
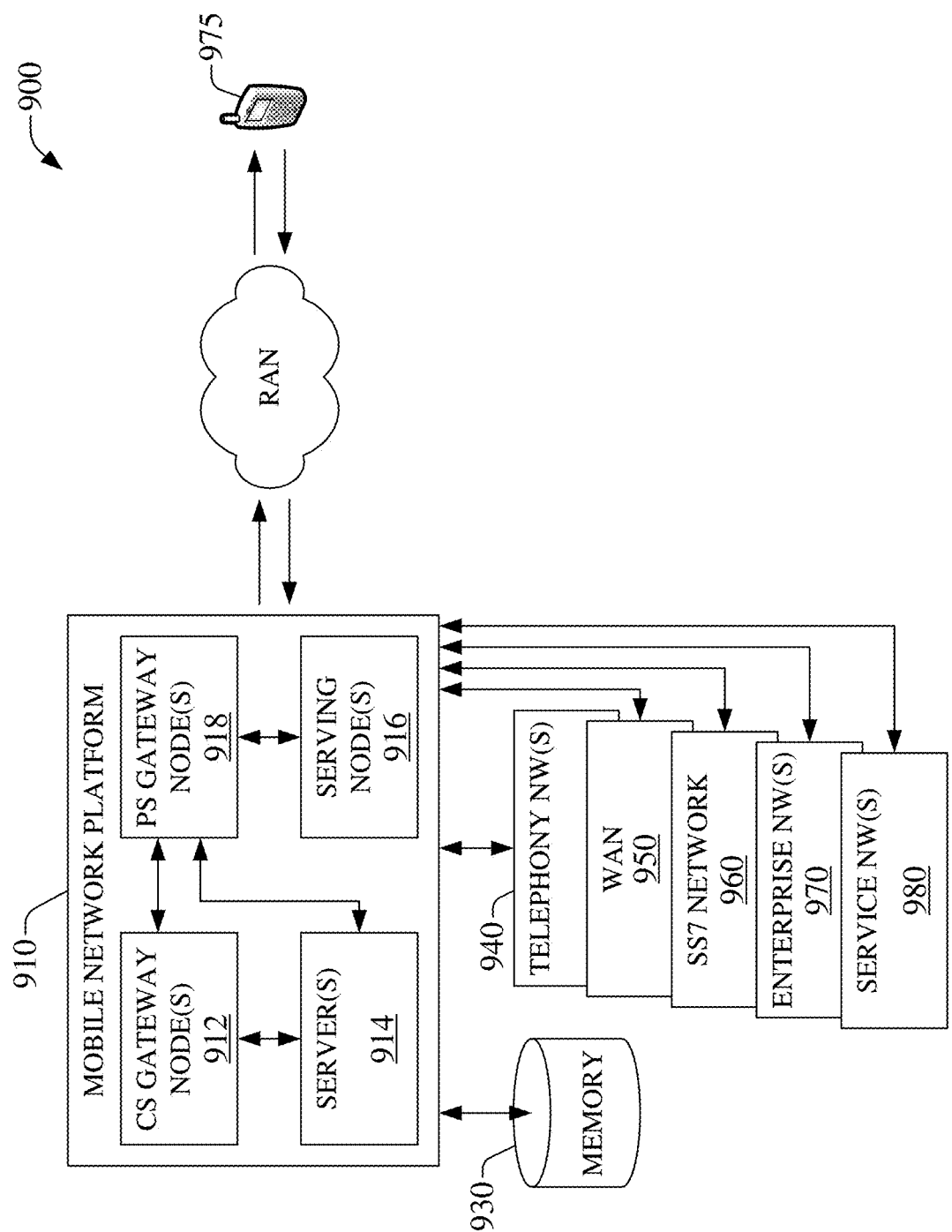
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
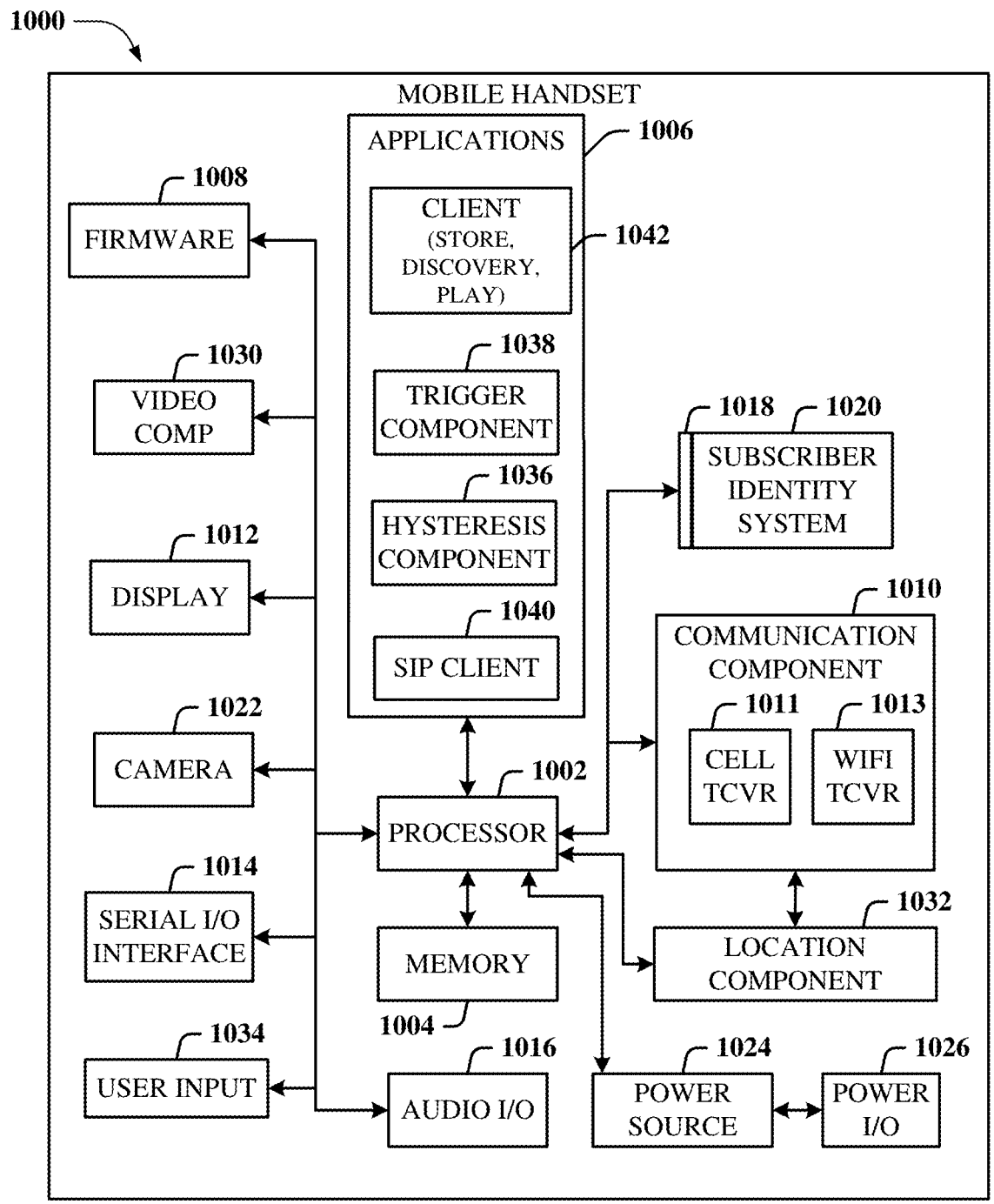
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
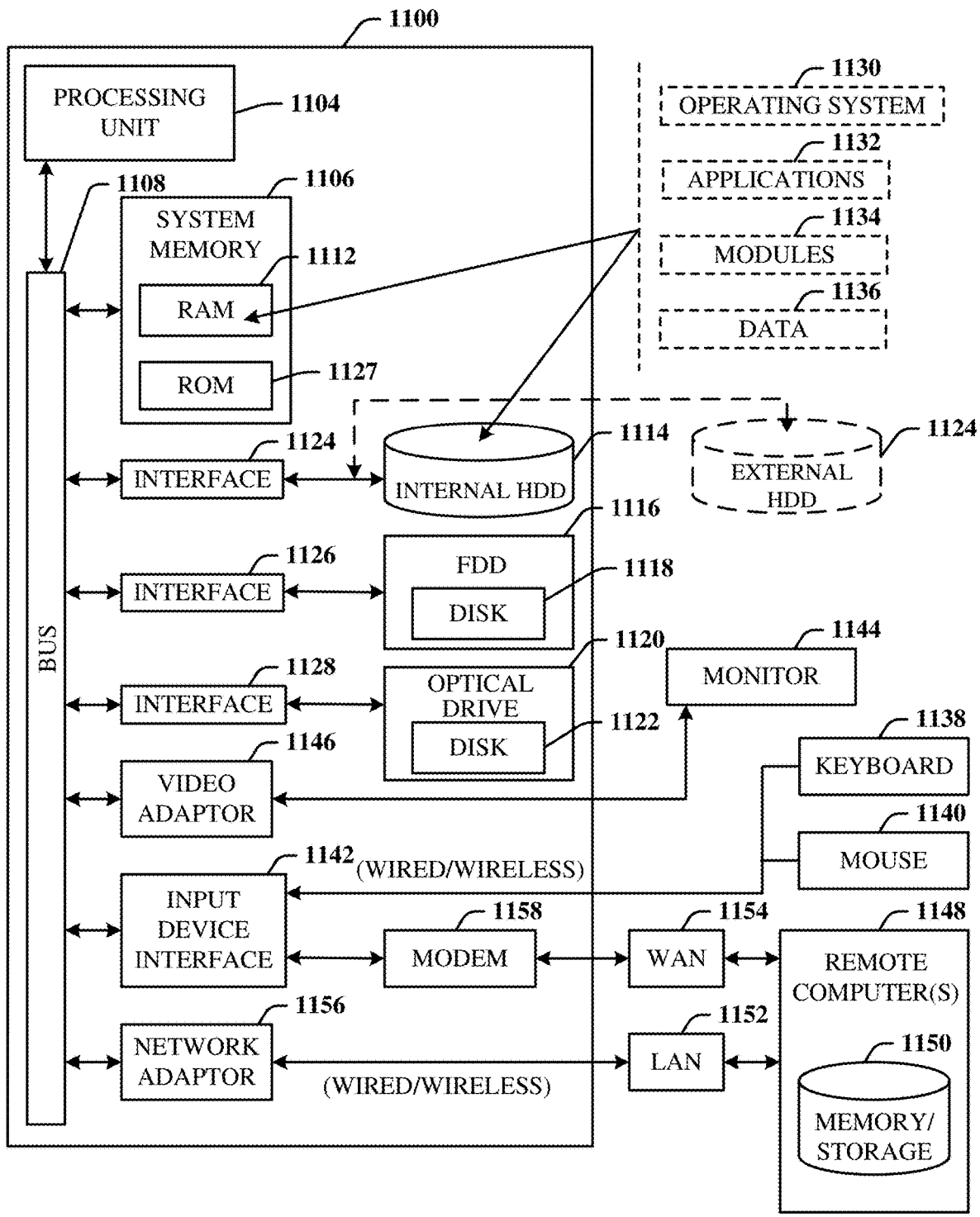
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
a processor; and
a memory that stores executable instructions that, when executed by the processor, facilitate performance of operations, comprising:
based on a field that jointly encodes a value representing a defined quasi-colocation behavior associated with a base station device, a slot index value representing a transmission time interval, and a subband index value representing a subband of subbands, adjusting the subband to form an aggregation of multiple subbands;
determining that a mobile device is in an idle state and that the mobile device has received a control message to facilitate scheduling a first transmission and a second transmission; and
facilitating transmission of the first transmission and the second transmission via the aggregation of multiple subbands, by the mobile device, as a proxy device for the base station device.

2. The device of claim 1, wherein the operations further comprise receiving the field from a network device of network devices as downlink transmission data comprising downlink control information applicable to a downlink channel of the network device.

3. The device of claim 2, wherein the downlink transmission data further comprises physical downlink shared channel data.

4. The device of claim 2, wherein the operations further comprise, in response to the network device using an orthogonal frequency division multiplexing encoding scheme, receiving a first orthogonal frequency division multiplexing symbol representing the downlink control information in a first subband of the subband of subbands.

5. The device of claim 4, wherein the operations further comprise receiving, subsequent to the first orthogonal frequency division multiplexing symbol, a second orthogonal frequency division multiplexing symbol.

6. The device of claim 5, wherein the second orthogonal frequency division multiplexing symbol comprises physical downlink shared channel data.

7. The device of claim 1, wherein the aggregation of multiple subbands comprises a middle frequency block.

8. The device of claim 7, wherein the operations further comprise determining the middle frequency block based on a physical resource block size associated with the subbands of the aggregation of multiple subbands.

9. The device of claim 1, wherein the operations further comprise facilitating scheduling the first transmission and the second transmission in a single transmission interval.

10. A method, comprising:
adjusting, by a device comprising a processor, a subband of subbands to form a grouping of multiple subbands, wherein the adjusting is based on a field that jointly encodes a value representing a defined quasi-colocation behavior associated with a base station device, a slot index value representing a transmission time interval, and a subband index value representing the subband of subbands;
determining, by the device, that a user equipment device has received a control message to facilitate scheduling a first transmission and a second transmission; and
facilitating, by the device, transmission of the first transmission and the second transmission via the grouping of multiple subbands, by the user equipment device, as a proxy device for the base station device.

11. The method of claim 10, further comprising determining, by the device, that the user equipment device is in an idle state.

12. The method of claim 10, further comprising receiving, by the device, the field from a network device of a group of devices as downlink transmission data comprising downlink control information applicable to a downlink channel of the network device.

13. The method of claim 12, further comprising, in response to detecting that the network device uses a frequency division multiplexing encoding scheme, receiving, by the device, a first frequency division multiplexing symbol representing the downlink control information in a first subband of the subband of subbands.

14. The method of claim 13, further comprising receiving, by the device, a second frequency division multiplexing symbol subsequent to the first frequency division multiplexing symbol.

15. The method of claim 10, further comprising determining, by the device, the base station device based on quasi-colocation data associated with a transmission of data scheduled based on downlink transmission data comprising downlink control data applicable to a downlink channel of a network device of a group of devices.

16. A non-transitory machine-readable medium, comprising executable instructions that, when executed by a processor, facilitate performance of operations, comprising:
adjusting a subband of subbands to create a group of multiple subbands, wherein the adjusting is based on a field that jointly encodes a value representing a defined quasi-colocation behavior associated with a base station device, a slot index value representing a transmission time interval, and a subband index value representing a subband of subbands;
determining that a user equipment device has received a control message to facilitate scheduling a first transmission and a second transmission; and
facilitating transmission of the first transmission and the second transmission via the group of multiple subbands using the user equipment device as a proxy device for the base station device.

17. The non-transitory machine-readable medium of claim 16, wherein the operations further comprise receiving the field from a network device of network devices as downlink transmission data comprising downlink control information applicable to a downlink channel of the network device.

18. The non-transitory machine-readable medium of claim 17, wherein the operations further comprise, in response to the network device using an orthogonal frequency division multiplexing encoding scheme, receiving a first orthogonal frequency division multiplexing symbol representing the downlink control information in a first subband of the subband of subbands.

19. The non-transitory machine-readable medium of claim 18, wherein the operations further comprise receiving a second orthogonal frequency division multiplexing symbol after receiving the first orthogonal frequency division multiplexing symbol.

20. The non-transitory machine-readable medium of claim 16, wherein the operations further comprise determining that the user equipment device is in an idle state.

* * * * *